March 28, 1961 R. L. MYERS ET AL 2,977,514
ELECTROLYTIC DEVICE WITH GEL ELECTROLYTE
AND METHOD OF MAKING THE SAME
Filed April 25, 1957
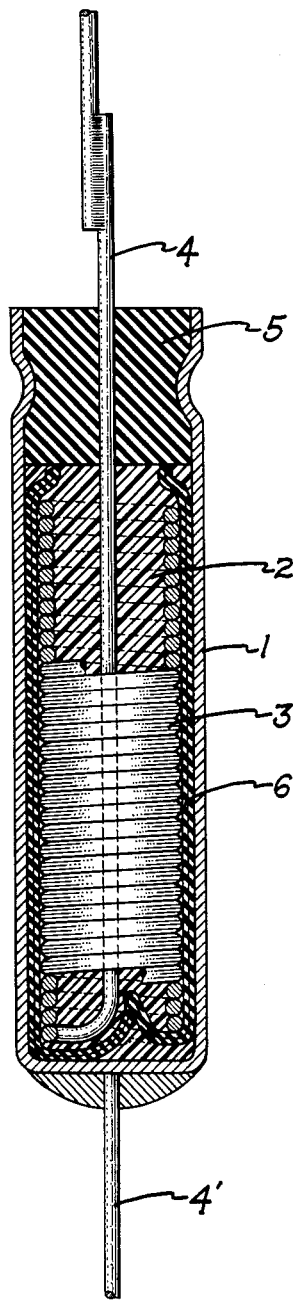
Inventors,
Robert L. Myers,
Millerd F. Gill,
by Gilbert P Tarleton
Their Attorney.

United States Patent Office 2,977,514
Patented Mar. 28, 1961

2,977,514

ELECTROLYTIC DEVICE WITH GEL ELECTROLYTE AND METHOD OF MAKING THE SAME

Robert Lee Myers and Millerd F. Gill, Glens Falls, N.Y., assignors to General Electric Company, a corporation of New York Filed Apr. 25, 1957, Ser. No. 655,031

7 Claims. (Cl. 317—230)

The present invention relates to electrolytic devices such as capacitors, and more particularly to an improved gel electrolyte therefor and a method of preparing the same.

Difficulties have been encountered in the past in the use of electrolytic capacitors having liquid electrolytes in that the electrolyte tends to escape from the capacitor casing through the bushing seals, either by leakage or evaporation. The result is that the electrical properties of the capacitor change because of electrolyte loss and the parts of the capacitor become corroded by the action of the escaped electrolyte thereon. To overcome this problem, electrolyes of semi-solid or gel consistency have been utilized heretofore, but the prior gel electrolytes have not proved satisfactory for use in capacitors for various reasons. In some cases, they have had poor conductivity characteristics, especially at low temperature, or were of insufficiently low viscosity initially to effectively impregnate the capacitor parts. The known capacitor gel electrolytes also have not proved adaptable for the high temperature operating conditions to which capacitors are presently being subjected, since the gel often liquefied at temperatures appreciably above room temperature and leakage again became a problem under those conditions.

It is an object of the present invention to provide electrolytic capacitors and a method of making the same which overcome the above disadvantages of prior types of electrolytic capacitors.

It is another object of the invention to provide an improved gel electrolyte for electrolytic capacitors which is adapted for use over a wide range of operating temperature without liquefying or freezing while retaining its electrical efficiency over the entire range.

It is a further object of the invention to provide an improved method of making an electrolytic capacitor having a gel electrolyte wherein the impregnating and gelling treatments are carried out in separate stages.

In a broad aspect, the present invention concerns an electrolytic device such as a capacitor or rectifier comprising spaced electrodes having interposed therebetween a gel electrolyte composed of a mixture of an ionogen and the reaction product of an aqueous solution of polyvinyl alcohol and a gelling agent therefor. In a preferred embodiment of the invention, the gelling agent is a compound such as boric acid which on the alkaline pH side cross-links the polyvinyl alcohol solution in the gelling stage, and forms a gel thereof which is thermally non-reversible.

In a method carried out in accordance with the invention, a liquid electrolyte composed of an aqueous mixture of an ionogen such as lithium chloride and a gelling additive comprising polyvinyl alcohol and cross-linking agent therefor is introduced into the capacitor for impregnating the same, and thereafter the electrolyte is subjected to the action of a volatile alkaline material to set the electrolyte in gel form.

The invention will be better understood from the following description taken in conjunction with the accompanying drawing, in which:

The single figure shows, partly cut away, an electrolytic capacitor embodying the present invention.

As shown in the drawing, the electrolytic capacitor may comprise a substantially cylindrical container or case 1 made of silver, for example, or other suitable metal which serves as the capacitor cathode. Cathode case 1 contains electrolyte 2 which in final form is of gel-like consistency and has the composition as more fully described below in accordance with the present invention. Anode 3 is of suitable conducting film-forming material, such as tantalum, aluminum, zirconium, titanium, niobium, or other known capacitor electrode metals, and may be in the form of a helically wound wire as shown. The anode, however, may be of any other desired form, such as a cylinder, helical strip, concentrically wound foil or other configuration. The surface of anode 3 is provided with a thin dielectric oixde film in accordance with well-known practice. Anode 3 may be composed of sintered metal or may be etched, in accordance with known processes, to provide a relatively large area for contact with the electrolyte.

In a polar type capacitor only the anode has a dielectric film formed on its surface as described, but the invention is also applicable to non-polar capacitors wherein both anode and cathode would be of film forming metal having dielectric films thereon.

Surrounding anode 3 and in contact therewith is spacer 6 which substantially fills the space between anode 3 and cathode case 1. Spacer 6 is of suitable non-conducting absorbent or porous material and is advantageously composed of Benares hemp, although other materials such as kraft paper, woven glass fibers, and the like may be used. Spacer 6 is thoroughly permeated by and impregnated with the gel electrolyte 2 contained in the capacitor casing.

The anode and cathode are provided with terminal leads 4, 4' respectively and the interior of capacitor casing 1 is sealed by a resilient plug 5 of rubber, synthetic resin, or other suitable non-conducting material. If desired, case 1 may be crimped at the top, as shown, around plug 5 in any suitable manner to make the seal more secure, but tightness of the seal, by virtue of the present gel electrolyte, is less critical than in prior types of capacitors where escape of electrolyte through the seal is a major factor.

In accordance with the invention, electrolyte 2 is composed of a mixture of a suitable ionogen (i.e., ion producing compound) to provide the necessary conductivity in the capacitor and the reaction product of an aqueous solution of polyvinyl alcohol and a cross-linking gelling agent therefor, such as boric acid. An especially suitable ionogen which is preferred for use in the electrolyte of the invention is lithium chloride, which is preferably of 9 molar concentration but may vary from 4 to 9 moles concentration. The lithium chloride ionogen is particularly suitable in view of its optimum resistivity over a wide temperature range, which is of the order of 200–300 ohm centimeters at —55° C. and 7–9 ohm centimeters at 25° C. However, the invention is not limited to this ionogen compound, and examples of other ionogens which may be used in practicing the invention are calcium chloride, zinc chloride, sulfuric acid, and other suitable ionogens known in the art for electrolytic capacitors.

Although polyvinyl alcohol has been suggested previously as a thickening agent for various purposes, it has not by itself been found satisfactory for use in capacitors, particularly where relatively high temperatures are encountered. At temperatures of 60° C. and over, the uncross-linked aqueous polyvinyl alcohol gels revert to a liquidus state and do not, therefore, effectively prevent the escape of the electrolyte from the capacitor at these temperatures.

It has been found, however, that high melting point gels, and of particular importance, thermally non-reversible gels suitable for use in electrolytic capacitors can be prepared from polyvinyl alcohol. In accordance with the invention, such gels can be achieved using polyvinyl alcohol solutions by initially adding thereto a pre-setting or cross-linking agent such as boric acid and thereafter exposing the thus treated polyvinyl alcohol solution to a volatile base such as ammonia. This treatment converts the electrolyte into gel form, and the gel thus produced does not revert to a liquid state even at temperatures of 85° C. to 100° C. or higher. It has been found further that the described polyvinyl alcohol and gelling ingredients not only do not adversely affect the desirable electrical properties of the lithium chloride ionogen, such as its optimum resistivity range, but also unexpectedly provide improved electrical characteristics at extremely low temperatures, e.g., from −20 to −50° C.

In order to attain the optimum efficiency of electrolytic capacitors in general, it is necessary to ensure that the spacer in contact with the anode is thoroughly impregnated with the electrolyte and that the electrolyte comes into intimate contact with the entire surface of the electrodes. For this reason, it is important that the electrolyte, at least during the impregnating stage, be a liquid of sufficiently low viscosity to permeate throughout the spacer and the minute interstices of the etched or sintered electrode surfaces. One of the difficulties encountered in the past where semi-solid or gel electrolytes were used is that in many cases the electrolytes had too high a viscosity to permit satisfactory impregnation of the capacitor parts, or they gelled too quickly after introduction into the capacitor. It was particularly difficult to impregnate the capacitor using such prior electrolytes where the mechanical parts of the capacitor were already assembled, a procedure which is often desirable to reduce manufacturing costs.

The present invention, however, makes it possible to initially introduce the electrolyte into the capacitor casing in the form of a low viscosity liquid for complete impregnation of the assembled capacitor parts, and thereafter at any convenient time to set the electrolyte by a simple fuming step, wherein the capacitor even with the sealing plug in place is subjected to the action of a volatile base such as ammonia. Such a procedure, by allowing an unlimited number of units to be assembled and filled for impregnation as long as desired without gelling occurring, considerably facilitates the manufacturing process and provides capacitors of greater efficiency than prior known types using other gel electrolyte compositions.

In a typical process for practicing the present invention, a mixture is made composed of one part by weight of 20% polyvinyl alcohol in distilled water and one part by weight of 9 molar lithium chloride. To about 6 parts of this mixture there is added one part of a solution containing 1% by weight of boric acid in distilled water. This mixture is then introduced into a number of assembled capacitors by immersing the capacitors, with their end plug in place, in the mixture and then subjecting them to a vacuum at temperatures sufficient to prevent thermal gellation of the mixture. After impregnation, the capacitors are removed from the mixture and subjected for 10 minutes to an atmosphere of ammonia vapor. This treatment completely and quickly gels the electrolyte which has thoroughly impregnated the spacer and electrodes and filled the interior of the capacitor. The capacitor casing is then crimped around the end plug and the units are washed in boiling water.

While water is preferred in making the polyvinyl alcohol solution, other polar liquids could be used, if desired, in preparing the solution.

In general, the final electrolyte composition preferably contains about 10% by weight of polyvinyl alcohol and about 0.16% by weight of boric acid. However, the invention is not limited to these proportions, it being found that satisfactory results are obtainable with a range of 2 to 40% of polyvinyl alcohol and 0.1 to 1.0% of boric acid in the final electrolyte composition.

Where elevated operating temperatures will be encountered in the use of the capacitors, say, of the order of 100° C. or higher, it is preferred to employ polyvinyl alcohol of higher molecular weights, which have been found to produce thermally non-reversible gels. An example of a commercially available polyvinyl alcohol of this type is marketed by E. I. du Pont de Nemours & Co. under the name "Elvanol No. 72–51," which is a completely hydrolyzed polyvinyl alcohol having a viscosity of 45–55 centipoises. A cross-linked gel electrolyte prepared in accordance with the invention from such material will not liquefy at elevated temperatures, but instead dehydration and syneresis will occur, leaving the gel intact.

The invention, however, is not limited to thermally irreversible gels of the above type, since the benefits of the two-stage gelling process described above, as well as other advantages, are obtained by the use of the low molecular weight polyvinyl alcohols, which have been found to produce gel electrolytes of substantially higher melting point than the prior known capacitor gel electrolytes. "Elvanol No. 70–05" having a viscosity of 4–6 centipoises, also produced by Du Pont, is a commercial type of low molecular weight polyvinyl alcohol which has been satisfactorily used to produce cross-linked gels remaining intact at temperatures up to 85° C.

Thus, it appears to be the cross-linking of polyvinyl alcohol in accordance with the invention, whether these compounds are of high or low molecular weight, which produces gel electrolytes of markedly improved stability under extreme temperature conditions. In addition, tests made of capacitor units with the various types of polyvinyl alcohol materials at −55° C. showed unexpectedly that capacitors with the present gel electrolytes retained a greater percentage of initial capacitance at that temperature than capacitors with the conventional lithium chloride electrolyte alone.

Boric acid has been found eminently suitable as the cross-linking agent for final gelling of the electrolyte, particularly since it provides the necessary acid conditions to maintain the electrolyte in low viscosity liquid condition until it is desired to gel the capacitor impregnant. Other agents which may be used instead of boric acid for this purpose are ferric ammonium sulfate, chromium sulfate, or copper sulfate. Other boron compounds such as borax may be used provided they are mixed with the polyvinyl alcohol under acid conditions, e.g., by adding a suitable amount of acetic acid.

The ammonia fumes used for finally setting the electrolyte may be, for example, a 28% ammonia solution (ammonium hydroxide) or from anhydrous ammonia gas. A satisfactory method of exposing the impregnated capacitor units to the ammonia fumes is simply to pour ammonium hydroxide into the bottom of a vessel in which the impregnated capacitor units are placed, the fuming preferably being done under vacuum conditions to ensure thorough contact of the ammonia with the electrolyte in the capacitors.

Volatile alkaline compounds other than ammonia may be used for bringing about the cross-linking of the polyvinyl alcohol and setting the gel, as, for example, methylamine, ethylamine or other compounds of this type.

While the fuming procedure using a volatile base is preferred it will be understood that setting of the electrolyte could be accomplished by reacting the electrolyte mixture with alkaline compounds in other ways. For example, the capacitor containing the electrolyte could be immersed or otherwise brought into direct contact with liquid alkaline compounds such as ammonium hydroxide, lithium hydroxide or similar bases.

There is thus provided by the invention an electrolytic capacitor and process of making it which have numerous advantages. The gel electrolyte produced has optimum conductivity characteristics and is operative over an extremely wide range of temperature. It remains in solid form even at temperatures well over 100° C., in the case of the thermally non-reversible gels, and thereby avoids the heretofore serious problem of electrolyte leakage through the capacitor seal at high operating temperatures. Of particular significance is the two-stage impregnating and gelling procedure provided by the invention which considerably facilitates the manufacture of electrolytic capacitors while still ensuring thorough impregnation of the capacitor parts.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electric capacitor comprising, in combination, a pair of spaced electrodes, at least one of said electrodes having a dielectric film formed thereon, and a thermally non-reversible gel electrolyte between said electrodes comprising a mixture of an ionogen and the reaction product of a solution of polyvinyl alcohol and a cross-linking gelling agent therefor selected from the group consisting of a boron compound, a ferric salt, a chromium salt, and a copper salt.

2. An electric capacitor comprising, in combination, a pair of spaced electrodes, at least one of said electrodes having a dielectric film formed thereon, non-conducting porous spacer material between said electrodes in contact with said one electrode, and a gel electrolyte between said electrodes thoroughly impregnating said non-conducting spacer material and comprising a mixture of an ionogen and the reaction product of an aqueous solution of polyvinyl alcohol and a cross-linking gelling agent therefor selected from the group consisting of a boron compound, ferric ammonium sulfate, chromium sulfate and copper sulfate.

3. An electrolytic capacitor comprising, in combination, a pair of spaced electrodes, one of said electrodes having a dielectric film formed thereon, non-conducting spacer material between said electrodes in contact with said one electrode, and a gel electrolyte between said electrodes thoroughly impregnating said spacer material, said gel electrolyte comprising a mixture of lithium chloride and the product of reaction under alkaline conditions of an aqueous solution of polyvinyl alcohol and boric acid.

4. An electrolytic capacitor comprising, in combination, an anode and a cathode, said anode having a dielectric film formed thereon, non-conducting spacer material between said anode and cathode, and a thermally non-reversible gel electrolyte between said anode and cathode thoroughly impregnating said spacer material, said thermally non-reversible gel electrolyte comprising a mixture of lithium chloride and the product of reaction of an aqueous solution of polyvinyl alcohol and boric acid with a volatile base.

5. In the method of making an electrolytic capacitor, the steps of adding to the capacitor a liquid electrolyte composed of a mixture of an ionogen, a solution of polyvinyl alcohol and a cross-linking gelling agent therefor selected from the group consisting of a boron compound, a ferric salt, a chromium salt, and a copper salt, and thereafter treating said liquid electrolyte while in the capacitor with a volatile alkaline compound to convert said electrolyte to a thermally non-reversible gel.

6. The method of making an electrolytic capacitor which comprises assembling a capacitor unit including a hollow casing and spaced electrodes, introducing into the capacitor casing between the electrodes a liquid electrolyte composed of a mixture of an ionogen, an aqueous solution of polyvinyl alcohol and a cross-linking gelling agent therefor to impregnate the capacitor, said gelling agent being selected from the group consisting of boron compound, ferric ammonium sulfate, chromium sulfate and copper sulfate, and thereafter exposing said liquid electrolyte in the impregnated capacitor to the vapor of a volatile base to convert said liquid electrolyte to a gel.

7. The method of making an electrolytic capacitor which comprises assembling a capacitor unit including a hollow casing and spaced electrodes therein, introducing into and impregnating the capacitor unit with a liquid electrolyte composed of a mixture of lithium chloride, an aqueous solution of polyvinyl alcohol and boric acid, and thereafter exposing said liquid electrolyte in the impregnated capacitor unit to the vapor of ammonia to convert said liquid electrolyte to an irreversible gel.

References Cited in the file of this patent

UNITED STATES PATENTS

| | | |
|---|---|---|
| 1,748,011 | Dooley | Feb. 18, 1930 |
| 1,829,177 | Yngve | Oct. 27, 1931 |
| 1,866,604 | Siegmund | July 12, 1932 |
| 1,998,202 | Robinson | Apr. 16, 1935 |
| 2,031,793 | Robinson | Feb. 25, 1936 |
| 2,290,998 | Robinson | July 28, 1942 |
| 2,455,936 | Lowe | Dec. 14, 1948 |
| 2,616,953 | Booe | Nov. 4, 1952 |
| 2,648,717 | Ross | Aug. 11, 1953 |
| 2,671,022 | Sargent | Mar. 2, 1954 |